United States Patent [19]

Kim

[11] Patent Number: 5,648,953
[45] Date of Patent: Jul. 15, 1997

[54] SUB-QUE CODE DATA READ CIRCUIT FOR COMPACT DISC REPRODUCTION APPARARTUS

[75] Inventor: Dae Young Kim, Seoul, Rep. of Korea

[73] Assignee: LG Electronics Inc., Seoul, Rep. of Korea

[21] Appl. No.: 528,982

[22] Filed: Sep. 15, 1995

[30] Foreign Application Priority Data

Sep. 17, 1994 [KR] Rep. of Korea ............... 23817/1994

[51] Int. Cl.$^6$ ............... G11B 7/00; G11B 20/10
[52] U.S. Cl. ............... 369/124; 369/47; 369/59; 369/32
[58] Field of Search ............... 369/48, 32, 47, 369/124, 58, 54, 59, 33, 50; 395/425, 250, 275

[56] References Cited

U.S. PATENT DOCUMENTS

| | | | |
|---|---|---|---|
| 5,177,720 | 1/1993 | Kondo | 369/48 |
| 5,200,943 | 4/1993 | Sano et al. | 369/48 |
| 5,274,779 | 12/1993 | Stewart et al. | 395/250 |
| 5,343,456 | 8/1994 | Maeda | 369/48 |
| 5,359,582 | 10/1994 | Kim | 369/47 |
| 5,414,686 | 5/1995 | Iitsuka | 369/48 |

*Primary Examiner*—Georgia Y. Epps
*Assistant Examiner*—Kim-Kwok Chu

[57] ABSTRACT

A sub-que code (Q subcode) data read circuit for a compact disc reproduction apparatus is capable of converting sub-que code data of serial bits output from the compact disc-digital signal processor of a CD-ROM drive into parallel bytes and adjusting positions of bits in the parallel bytes, thereby enabling a microcomputer to read the sub-que code data through the sub-que code data read circuit without directly reading the data. Accordingly, the load of the microcomputer can be reduced, thereby enabling data processing at a high speed. In particular, the program used in the microcomputer can be simplified so that the CD-ROM drive can reproduce data at a high speed.

19 Claims, 5 Drawing Sheets

FIG. 1
CONVENTIONAL ART
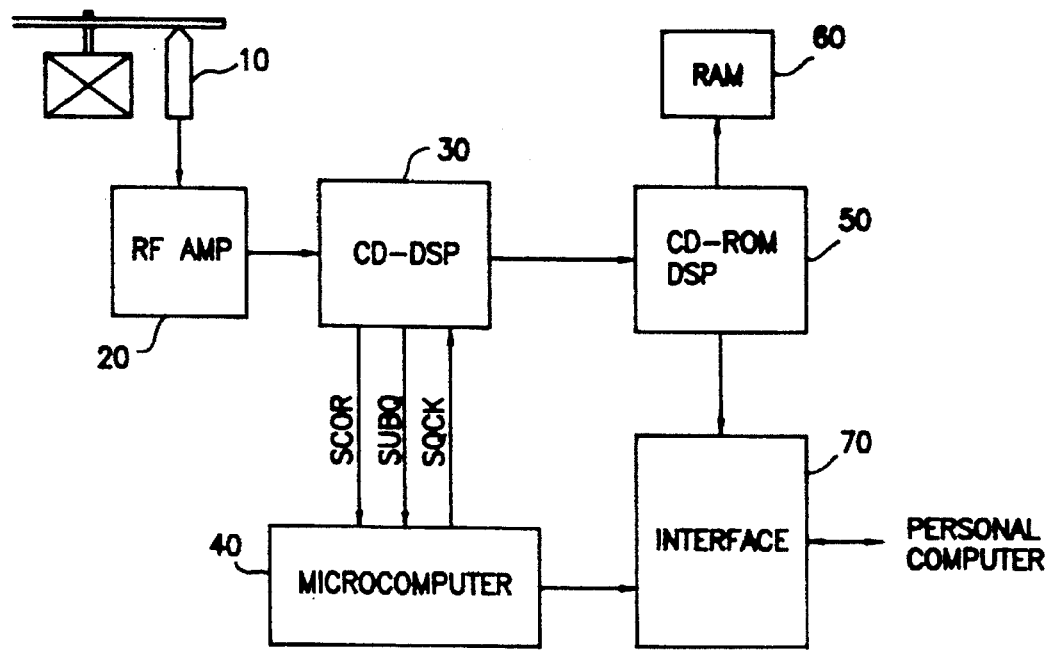
FIG.2A
CONVENTIONAL ART
FIG.2B
CONVENTIONAL ART
FIG.2C
CONVENTIONAL ART

SUB-QUE CODE DATA READ CIRCUIT FOR COMPACT DISC REPRODUCTION APPARARTUS

BACKGROUND OF THE INVENTION

1. Field of the Invention

The present invention relates to a compact disc reproduction apparatus, and more particularly to a sub-que code (Q subcode) data read circuit for a compact disc reproduction apparatus constructed to convert sub-que code data of serial bits output from the CD-DSP of a CD-ROM drive into that of parallel bytes and to adjust positions of bits in the parallel bytes so that a microcomputer can read the sub-que code data through the sub-que code data read circuit without directly reading the data, thereby capable of reproducing data recorded on a compact disc at a high speed.

2. Description of the Prior Art

Generally, sub-que code data, which is obtained when data recorded on a compact disc is reproduced in a compact disc reproduction apparatus, contains information relating to the data being reproduced. The information contained in such sub-que code data includes data position (time) information, music information, data characteristic and etc.. Such sub-que code data is constituted by 10 bytes (namely, 80 bits) per block (1/75 second at a single reproducing speed).

When data recorded on a compact disc is reproduced using a CD-ROM drive, sub-que code data is usually detected.

Referring to FIG. 1, there is illustrated a CD-ROM drive as a conventional compact disc reproduction apparatus. As shown in FIG. 1, the CD-ROM drive includes a pick-up 10 for convening data recorded on a disc into an electrical signal, a radio frequency amplifier 20 for amplifying the electrical signal output from the pick-up 10, and a compact disc-digital signal processor (CD-DSP) 30 for processing an output from the radio frequency amplifier 20 in a digital manner, thereby reproducing general data and sub-que code data. The CD-ROM drive also includes a microcomputer 40 for reading the sub-que code data output from the CD-DSP 30 and thereby discriminating data recorded on the compact disc, a CD-ROM DSP 50 for processing the general data output from the CD-DSP 30 in a digital manner, a RAM 60 for storing the general data output from the CD-ROM DSP 50, and an interface 70 for coupling both the microcomputer 40 and the CD-ROM DSP 50 to a personal computer PC.

Now, the sub-que code data reading operation of the compact disc reproduction apparatus having the above-mentioned construction will be described in conjunction with FIGS. 1 to 3.

Once the pick-up 10 converts data recorded on a compact disc into an electrical signal, it sends the signal to the radio frequency amplifier 20 which, in turn, amplifies the received signal to a desired level. The amplified signal is then applied to the CD-DSP 30.

The CD-DSP 30 processes the output from the radio frequency amplifier 20 in a digital manner, thereby reproducing general data and sub-que code data including data position (time) information, music information, data characteristic, etc., all relating to the data recorded on the compact disc. The CD-ROM DSP 50 receives the general data from the CD-DSP 30 and processes it in a digital manner. The CD-ROM DSP 50 then stores the processed data in the RAM 60. Meanwhile, the microcomputer 40 reads the sub-que code data from the CD-DSP 30 and discriminates information about the data recorded on the compact disc on the basis of the sub-que code data. This will be described in more detail.

Every time the CD-DSP 30 detects sub-que code data of one block (10 bytes) as it processes the output from the radio frequency amplifier 20 in a digital manner, it outputs a synchronous signal SCOR with a high level as shown in FIG. 2A. Thereafter, the CD-DSP 30 sends an error checking signal CRCF (FIG. 2C) to the microcomputer 40. The error checking signal CRCF is indicative of whether a group of sub-que code data in the current block has an error.

Upon receiving the synchronous signal SCOR and the error checking signal CRCF, the microcomputer 40 checks whether the sub-que code data group of the current block has an error, based on the error checking signal CRCF. When the error checking signal CRCF has a level of "1", that is, when no error is involved, the microcomputer 40 outputs a clock signal SQCK with a level of "0" as shown in FIG. 2B. Thereafter, the microcomputer 40 outputs a clock signal SQCK with a level of "1" to read and store the first one-bit Q5 of the sub-que code data SUBQ as shown in FIG. 2C. After completing the reading and storing operation for the first one-bit Q5, the microcomputer 40 outputs a clock signal SQCK with a level of "0" and then with a level of "1" to read and store the second one-bit Q6 of the sub-que code data SUBQ. The microcomputer 40 then repeats the above procedure until the 8th one-bit Q4 is read and stored. Thereafter, the microcomputer 40 converts the sub-que code data read and stored one bit by one bit into that of one byte. After completing the conversion, bits of the first one-byte data are adjusted in position to have the order of Q8, Q7, Q6, Q5, Q4, Q3, Q2 and Q1. The rearranged first one-byte data is then stored.

Subsequently, the microcomputer 40 reads the next bit string of the sub-que code data SUBQ by bits and converts it into that of one byte. This second one-byte sub-que code data is then stored. The microcomputer 40 then repeats this procedure until the 10th one-byte sub-que code data is stored, thereby completing reading for the sub-que code data of one block. After completing this reading, the microcomputer 40 completes the overall reading procedure.

In other words, the microcomputer 40 reads 80 bits of the sub-que code data in a sequential manner as it generates 80 clock signals SQCK sequentially. After reading the data, the microcomputer 40 converts the data read by bits into that of bytes. For each byte, its bits are adjusted in position to have a desired bit order. As this adjustment operation is executed 10 times, the reading operation for the sub-que code data of one block (10 bytes=80 bits) is completed. After completing this reading operation, the data recorded on the compact disc, which includes data position (time) information, music information, data characteristic etc., are discriminated through an operating procedure.

Thereafter, the CD-ROM drive, which is an example of a compact disc reproduction apparatus, sends general data and sub-que code data stored in the RAM 60 to the personal computer PC via the interface 70 so that the data recorded on the compact disc can be reproduced. As mentioned above, the sub-que code data includes data position (time) information, music information, data characteristic, etc.

In the conventional compact disc reproduction apparatus wherein the microcomputer 40 directly reads the sub-que code data from the CD-DSP 30, the microcomputer 40 should execute, for every interval of clock pulses, executive codes involving at least four processing steps, that is, a bit clearing operation (BIT CLEAR) for clearing the bit as "0", a bit setting operation (BIT SET) for setting the bit as "1", a move operation (MOVE) for reading the serial sub-que code data, and a shift operation (SHIFT) for storing the read data. As a result, the microcomputer 40 should execute executive codes involving at least 34 processing steps in the case of reading one byte and involving at least 340 processing steps in the case of reading one block.

Where the microcomputer 40 is of the medium grade having an internal frequency of 5 MHz, a time of about 2 to 3 μsec is taken in executing each of the commands such as BIT CLEAR, BIT SET, MOVE or SHIFT. Accordingly, a time of about 0.7 to 1.2 msec is taken in the case wherein executive codes involving 340 processing steps are executed to read sub-que code data of one block.

However, the microcomputer used in the compact disc reproduction apparatus must not consume too much time in reading the sub-que code data because it also has to execute a transfer of the read sub-que code data to a personal computer and control internal servo circuits in addition to the reading operation for the sub-que code data.

Where sub-que code data of one block is reproduced at a single speed ($1/75$ sec=13.3 msec), the above-mentioned time of about 0.7 to 1.2 msec causes no problem in the conventional compact disc reproduction apparatus. However, such time becomes problematic at double, triple or quadruple reproduction speed.

At quadruple reproduction speed, for example, the data reading time of about 0.7 to 1.2 msec becomes obstructive to the real-time reproduction of the CD-ROM drive because about $1/3$ of the entire reproduction time (3.3 msec) is consumed to read the sub-que code data.

In order to reduce the load of the microcomputer in the CD-ROM drive, a scheme has also been made wherein another microcomputer is added to distribute the total microcomputer's load. However, this scheme has problems of an increase in cost and problems of requiring a complex interface between the microcomputers.

SUMMARY OF THE INVENTION

Therefore, an object of the invention is to provide a sub-que code data read circuit for a compact disc reproduction apparatus constructed to convert sub-que code data of serial bits output from the CD-DSP of a CD-ROM drive into that of parallel bytes and to adjust positions of bits in the parallel bytes so that a microcomputer can read the sub-que code data through the sub-que code data read circuit without directly reading the data, thereby capable of reproducing data recorded on a compact disc at a high speed.

In accordance with the present invention, this object is accomplished by providing a sub-que code data read circuit for a compact disc reproduction apparatus comprising: an operation initiating unit connected between a compact disc-digital signal processor for detecting sub-que code data and a microcomputer both equipped in the compact disc reproduction apparatus, the operation initiating unit outputting a clock signal received from the external in accordance with a synchronous signal output from the compact disc-digital processor and an enable signal output from the microcomputer; a D-flip-flop for holding an inverted output thereof in accordance with the clock signal output from the operation initiating unit, thereby outputting a clock signal; another D-flip-flop flip-flop for detecting an error checking signal from the sub-que code data output from the compact disc-digital signal processor in accordance with the synchronous signal, thereby outputting the detected error checking signal to the microcomputer; a 4-bit counter for counting pulses of the clock signal output from the first D-flip-flop and thereby outputting a ready signal to the microcomputer; a data converting unit for shifting the serial sub-que code data output from the compact disc-digital signal processor by bits in accordance with the clock signal output from the first D-flip-flop to convert the serial sub-que code data into parallel byte data, adjusting the position of each bit in the parallel data in accordance with a read signal from the microcomputer and then sending the resulting data to the microcomputer; and a timing control unit for composing the enable signal and the read signal both output from the microcomputer with each other, thereby generating a signal for clearing the counter, the timing control unit also composing the ready signal output from the counter and the read signal with each other, thereby generating a signal for presetting the first D-flip-flop.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objects and aspects of the invention will become apparent from the following description of embodiments with reference to the accompanying drawings in which:

FIG. 1 is a block diagram of a CD-ROM drive as a conventional compact disc reproduction apparatus;

FIGS. 2A, 2B and 2C are timing diagrams of various signals used to reading sub-que code data in the apparatus of FIG. 1;

DETAILED DESCRIPTION OF THE PREFERRED EMBODIMENTS

Figure 3:
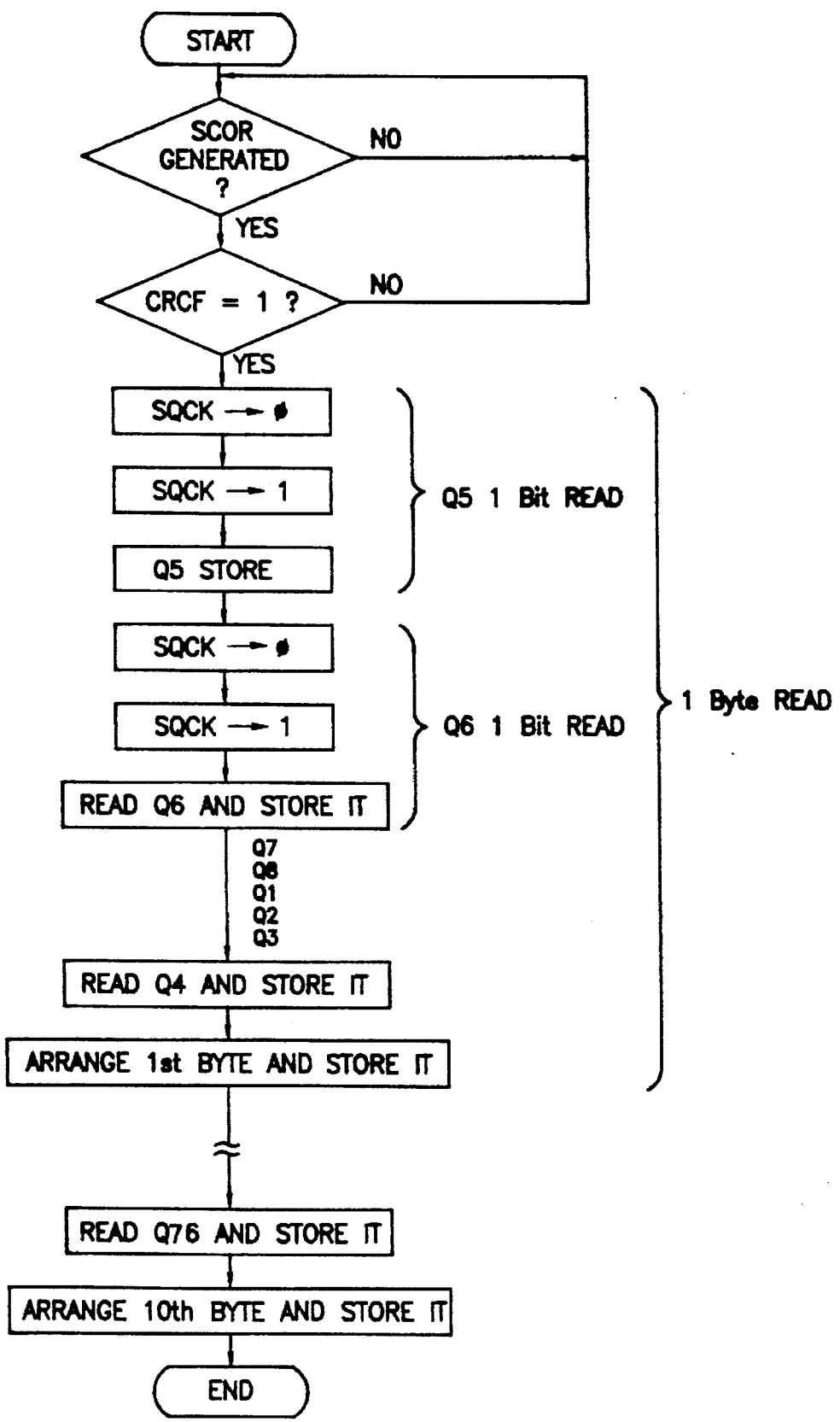
FIG. 3 is a flow chart illustrating the procedure of reading the sub-que code data in the apparatus of FIG. 1.
Figure 4:
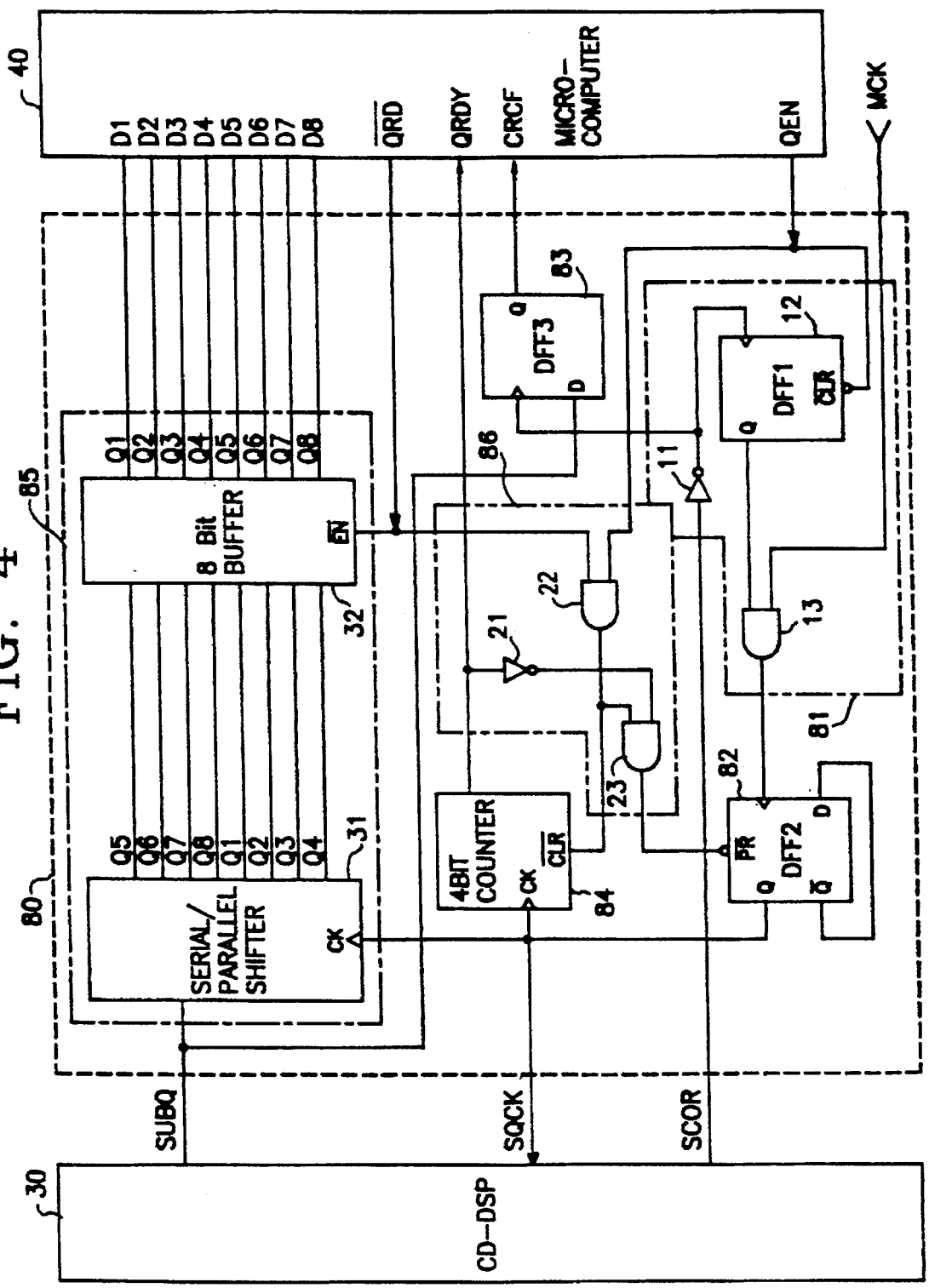
FIG. 4 is a block diagram illustrating a sub-que code data read circuit for a compact disc reproduction apparatus in accordance with the embodiments of the present invention.

Referring to FIG. 4, there is illustrated a sub-que code data read circuit for a compact disc reproduction apparatus in accordance with the present invention. The compact disc reproduction apparatus, to which the present invention is applied, have the construction as shown in FIG. 1.

As shown in FIG. 4, the sub-que code data read circuit, which is denoted by the reference numeral 80, includes an operation initiating unit 81 connected between a CD-DSP 30 and a microcomputer 40. The operation initiating unit 81 is cleared by an enable signal QEN output from the microcomputer 40. The operation initiating unit 81 outputs a clock signal MCK, received externally, in accordance with a synchronous signal SCOR output from the CD-DSP 30. A D-flip-flop (DFF2) 82 is coupled to the operation initiating unit 81 to receive the clock signal MCK. In accordance with the clock signal MCK, the D-flip-flop 82 holds its inverted output Q and outputs a clock signal SQCK. Another D-flip-flop (DFF3) 83 is also coupled to the operation initiating unit 81. The D-flip-flop 83 operates in accordance with the synchronous signal SCOR to detect an error checking signal CRCF from sub-que code data SUBQ output from the CD-DSP 30. The D-flip-flop 83 sends the detected error checking signal CRCF to a microcomputer 40. The sub-que code data read circuit 80 also includes a 4-bit counter 84 for counting pulses of a clock signal SQCK output from the D-flip-flop 82 and thereby outputting a ready signal QRDY to the microcomputer 40. A data converting unit 85 is also coupled between the CD-DSP 30 and the microcomputer 40. The data converting unit 85 serves to shift the serial sub-que code data SUBQ output from the CD-DSP 30 by bits in accordance with the clock signal SQCK output from the D-flip-flop 82 so that the serial sub-que code data SUBQ is converted into parallel byte data. The data converting unit 85 also adjusts the position of each bit in the parallel data and then sends the resulting data to the microcomputer 40. The sub-que code data read circuit 80 further includes a timing control unit 86 for ANDing the enable signal QEN and read signal $\overline{QRD}$ both output from the microcomputer 40 with each other, thereby generating a signal for clearing the counter 84. The timing control unit 86 also composes the ready signal QRDY output from the counter 84 and the read signal QRD with each other, thereby generating a signal for presetting the D-flip-flop 82.

The operation initiating unit 81 includes an inverter 11 adapted to invert the synchronous signal SCOR received from the CD-DSP 30, a D-flip-flop (DFF1) 12 adapted to be cleared by the enable signal QEN from the microcomputer 40, thereby latching an output from the inverter 11, and an AND gate 13 adapted to output the clock signal MCK, received externally in accordance with an output from the D-flip-flop 12.

The timing control unit 86 includes an inverter 21 adapted to invert the ready signal QRDY output from the counter 84, an AND gate 22 adapted to logically multiply the enable signal QEN and read signal QRD both output from the microcomputer 40 together, thereby generating a signal for clearing the counter 84, and an AND gate 23 adapted to logically multiply outputs from the inverter 21 and AND gate 22, thereby generating a signal for presetting the D-flip-flop 82.

The data converting unit 85 includes a serial/parallel shifter 31 adapted to shift the serial sub-que code data SUBQ output from the CD-DSP 30 by bits in accordance with the clock signal SQCK output from the D-flip-flop 82, thereby converting the serial sub-que code data SUBQ into parallel byte data, and a 8-bit buffer 32 adapted to adjust the position of each bit in the parallel byte data output from the serial/parallel shifter 31 in accordance with the read signal QRD from the microcomputer 40 and sending the adjusted data to the microcomputer 40.

Figures 5A, 5B, 5C, 5D, 5E, 5F, 5G, 5H:
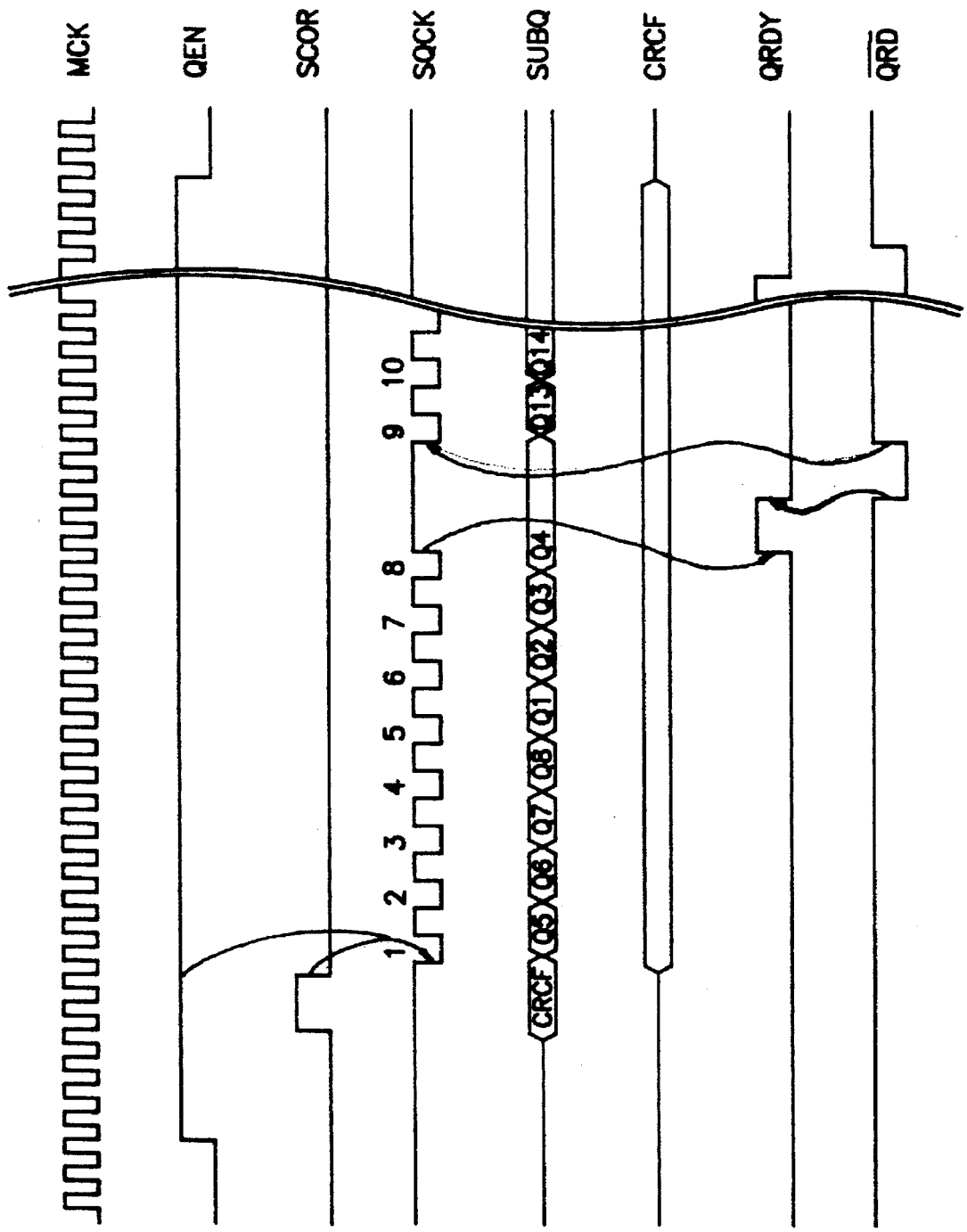
FIGS. 5A to 5H are examples of timing diagrams of various signals used to reading sub-que code data in the apparatus of FIG. 4.
Figure 6:
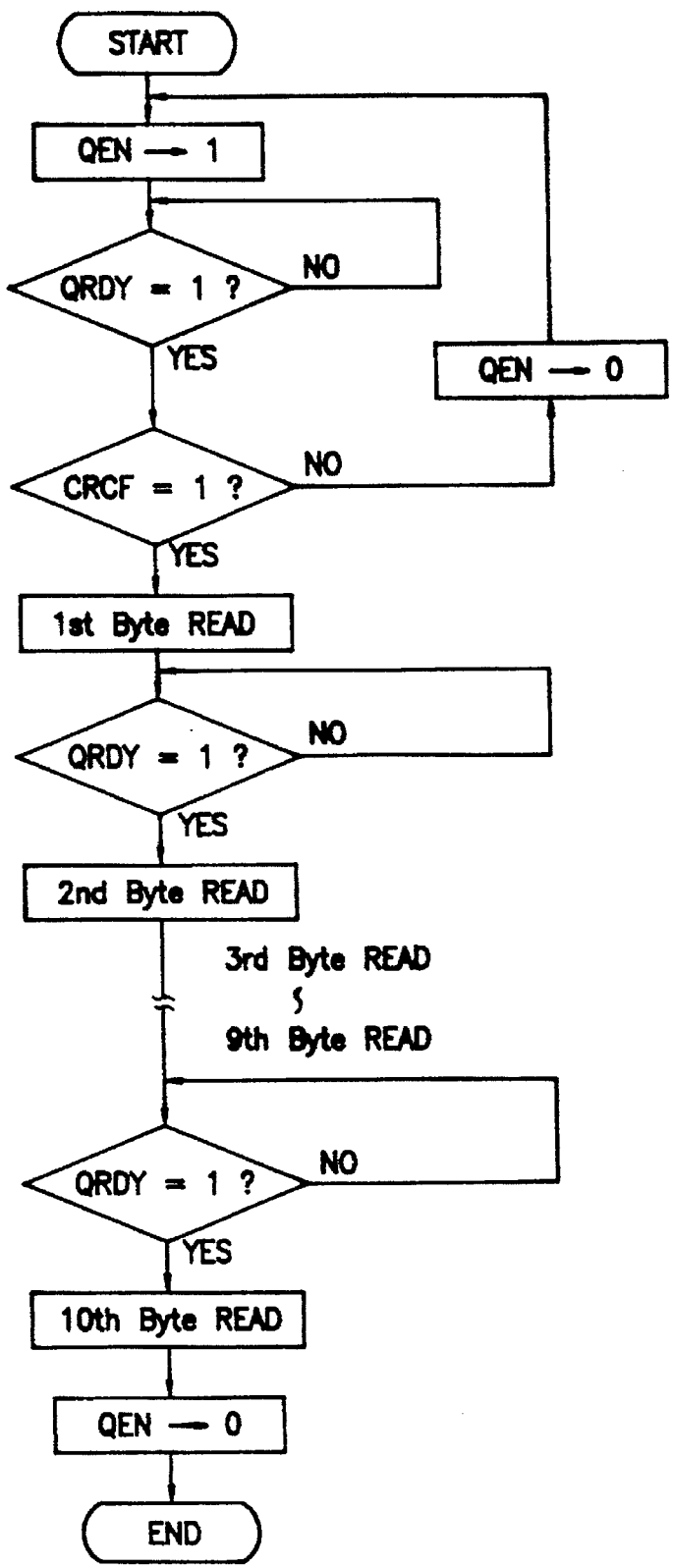
FIG. 6 is a flow chart illustrating the procedure of reading the sub-que code data in the apparatus of FIG. 4.

Operation of the sub-que code read circuit having the above-mentioned arrangement in accordance with the present invention will be described in conjunction with FIGS. 4 to 6.

Once the pick-up 10 detects data recorded on a compact disc, it sends it to the radio frequency amplifier 20 which, in turn, amplifies the received signal to a desired level. The amplified signal is then applied to the CD-DSP 30. This CD-DSP 30 processes the output from the radio frequency amplifier 20 in a digital manner, thereby detecting generated data and sub-que code data SUBQ including data position (time) information, music information, data characteristic, etc., all relating to the data recorded on the compact disc.

The CD-ROM DSP 60 receives the general data from the CD-DSP 30 and processes it in a digital manner. The CD-ROM DSP 50 then stores the processed data in the RAM 60. Meanwhile, the microcomputer 40 reads the sub-que code data SUBQ output from the CD-DSP 30. In order to read the sub-que code data SUBQ, the microcomputer 40 sends an enable signal QEN with a high level (FIG. 5B) to both the operation initiating unit 81 and timing control unit 86 of the sub-que code read circuit 80. At this time, the microcomputer 40 also sends a read signal QRD with a high level to both the inverting enable terminal EN of the buffer 32 in the data converting unit 85 and one input terminal of the AND gate 22 in the timing control unit 86. Simultaneously, a clock signal MCK of 2 MHz is input to one input terminal of the AND gate 13 in the operation initiating unit 81.

In the operation initiating unit 81, the high-level enable signal QEN is applied to the inverting clear terminal CLR, thereby clearing the D-flip-flop 12. The enable signal QEN is also applied to the other terminal of the AND gate 22 in the timing control unit 86, thereby causing the AND gate 22 to output a high-level signal. This high-level signal from the AND gate 22 is applied to both the inverting clear terminal CLR of the counter 84 and one input terminal of the AND gate 23.

In response to the high-level signal from the AND gate 22, the counter 84 outputs a low-level signal which is, in turn, inverted in the inverter 21. The high-level signal from the inverter 21 is applied to the other input terminal 23 of the AND gate 23, thereby causing the AND gate 23 to output a low-level signal. This low-level signal from the AND gate 23 is sent to the inverting preset terminal of the D-flip-flop 82.

When a synchronous signal SCOR (FIG. 5C) from the CD-DSP 30 is applied to the operation initiating unit 81 in the above-mentioned state, it is inverted by the inverter 11 and then applied to the D-flip-flop 12. At the leading edge of the inverted synchronous signal SCOR, the D-flip-flop 12 applies a high-level signal to the other input terminal of the AND gate 13. As a result, the 2 MHz clock signal MCK is sent to the D-flip-flop 82 through the AND gate 13.

At the leading edge of the 2 MHz clock signal MCK, the D-flip-flop 82 outputs a clock signal SQCK with a low level at its output terminal Q while holding a high-level output signal at the output terminal Q so that it can output a high-level clock signal SQCK at the output terminal Q at the next leading edge of the clock signal MCK. As a result, a two-frequency-divided clock signal SQCK of 1 MHz (FIG. 5D) is applied to the CD-DSP 30, the counter 84 and the clock terminal CK of the serial/parallel shifter 31 in the data converting unit 85.

In response to the clock signal SQCK from the D-flip-flop 82, the CD-DSP 30 sends the sub-que code data SUBQ having the form of a serial bit string to both the serial/parallel shifter 31 of the data converting unit 85 and the D-flip-flop 83. Meanwhile, the 4-bit counter 84 counts the clock signal SQCK received from the D-flip-flop 82 by incrementing its counted value by one at every leading edge of the clock signal SQCK.

From the sub-que code data SUBQ received from the CD-DSP 30, the D-flip-flop 83 detects an error checking signal CRCF (FIG. 5F) which is, in turn, sent to the microcomputer 40. On the other hand, the serial/parallel shifter 31 shifts the sub-que code data SUBQ received serially from the CD-DSP 30 in accordance with the clock signal SQCK output from the D-flip-flop 82, thereby converting the sub-que code data SUBQ into parallel data. This parallel data is then sent to the 8-bit buffer 32.

When the counted value in the 4-bit counter 84 reaches 8 as it is incremented by one at every leading edge of the clock signal SQCK received from the D-flip-flop 82, the counter 84 generates a ready signal QRDY with a high-level at the eighth leading edge of the clock signal SQCK. The ready signal QRDY is indicative of the fact that the sub-que code data SUBQ of 1 byte (FIG. 5G) is output from the serial/parallel shifter 31. This ready signal QRDY is sent to both the microcomputer 40 and the timing control unit 86.

In the timing control unit 86, the ready signal QRDY is inverted by the inverter 21 and then applied to one input terminal of the AND gate 23. As a result, the AND gate 23 outputs a high-level signal. This high-level signal from the AND gate 23 is applied to the inverting preset terminal of the D-flip-flop 82, thereby causing the D-flip-flop 82 to be in its preset state. Accordingly, the D-flip-flop 82 cuts off the generation of the clock signal SQCK.

The reason for cutting off the generation of the clock signal SQCK by switching the D-flip-flop 82 to its preset state is because the parallel sub-que code data SUBQ of 1 byte output from the serial/parallel shifter 31 in the data converting unit 85 is held until it is received by the microcomputer 40 after completing the position adjustment for each bit thereof in the buffer 32.

Upon receiving the high-level ready signal QRDY from the counter 84, the microcomputer 40 generates a read signal QRD with a low level (FIG. 5H) in accordance with the error checking signal CRCF received from the D-flip-flop 83. The read signal QRD is sent to the inverting enable terminal EN of the buffer 32 in the data converting unit 85 and the timing control unit 86.

In the timing control unit 86, the AND gate 22 outputs a low-level signal on the basis of the low-level read signal QRD, thereby the counter 84 is to be cleared. On the other hand, the buffer 32 is enabled by the read signal QRD. As a result, the buffer 32 executes a position adjustment for each bit of the 1-byte parallel sub-que code data SUBQ received from the serial/parallel shifter 31. That is, the sub-que code data SUBQ received to the buffer 32 in the bit order of Q4, Q3, Q2, Q1, Q8, Q7, Q6 and Q5 is adjusted in bit position to have the bit order of Q8, Q7, Q6, Q5, Q4, Q3, Q2 and Q1. The re-arranged sub-que code data SUBQ is then sent to the microcomputer 40. Thus, the read operation for the 1-byte sub-que code data is completed.

When the read operation for the 1-byte sub-que code data is completed, the microcomputer 40 outputs a read signal QRD with a high level. By this high-level read signal QRD, the AND gates 22 and 23 of the timing control unit 86 output high-level signals, respectively. As a result, the D-flip-flop 82, which receives the output signal from the AND gate 23 at its inverting preset terminal, divides the frequency of the clock signal MCK received from the operation initiating unit 81 by two again, thereby outputting a half-frequency-divided clock signal SQCK. The counter 84 counts the clock signal SQCK output from the D-flip-flop 82 again and generates a high-level ready signal QRDY when the counted value corresponds to 8. This high-level ready signal QRDY is sent to the microcomputer 40.

Upon receiving the ready signal QRDY, the microcomputer 40 applies a low-level read signal QRD to the data converting unit 84 so that it can receive a second 1-byte sub-que code data adjusted in bit position. Accordingly, the microcomputer 40 reads the second 1-byte sub-que code data.

The above procedure is then repeated until the microcomputer 40 reads the 10th 1-byte sub-que code data, thereby completing reading for all sub-que code data of one block output from the CD-DSP 30. After completing this reading, the microcomputer 40 outputs an enable signal QEN with a low level and completes its read operation for the sub-que code data SUBQ.

The read operation of the microcomputer 40 will now be described in conjunction with FIG. 6. As shown in FIG. 6, the microcomputer 40 first applies a high-level enable signal QEN to the sub-que code data read circuit 80, thereby causing the circuit 80 to be activated. Thereafter, the microcomputer 40 checks whether a high-level ready signal QRDY has been input.

If the high-level ready signal QRDY has been input, the microcomputer 40 then checks whether an error checking signal CRCF has been input. When a high-level error checking signal indicative of no error has been input, the microcomputer 40 reads the first-byte sub-que code data output from the sub-que code data read circuit 80.

When the microcomputer 40 receives the high-level ready signal QRDY from the sub-que code data read circuit 80 again after completing its reading for the first 1-byte data, it reads the second 1-byte data. Thereafter, the microcomputer 40 reads the third 1-byte data when receiving the high-level ready signal QRDY again. The microcomputer 40 repeats the above procedure until it reads the 10th 1-byte sub-que code data, thereby completing reading for all sub-que code data of one block output from the sub-que code data read circuit 80. After completing this reading, the microcomputer 40 outputs an enable signal QEN with a low level and completes its read operation for the sub-que code data SUBQ.

Therefore, the microcomputer 40 can reduce executive codes greatly, so that the sub-que code data SUBQ output from the CD-DSP 30 can be read at a high speed.

Thereafter, the CD-ROM drive, which is an example of a compact disc reproduction apparatus, sends general data and sub-que code data stored in the RAM 60 to the personal computer PC via the interface 70 so that the data recorded on the compact disc can be reproduced. As mentioned above, the sub-que code data includes data position (time) information, music information, data characteristic, etc.

As apparent from the above description, the present invention provides a sub-que code data read circuit for a compact disc reproduction apparatus capable of converting sub-que code data of serial bits output from the CD-DSP of a CD-ROM drive into that parallel bytes of the same data and adjusting positions of bits in the parallel bytes, thereby enabling a microcomputer to read the sub-que code data through the sub-que code data read circuit without directly reading the data. Accordingly, the load of the microcomputer can be reduced, thereby enabling data processing at a high speed. In particular, the program used in the microcomputer can be simplified so that the CD-ROM drive can reproduce data at a high speed. Since an error detection for the sub-que code data is always carried out, it is possible to prevent erroneous operations caused by erroneous data.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A sub-que code data read circuit for a compact disc reproduction apparatus including a microprocessor and a compact disc-digital signal processor outputting serial sub-que code data, the read circuit comprising:

an operation initiating unit connected between the compact disc-digital signal processor and the microcomputer, the operation initiating unit outputting a first clock signal received thereto in accordance with a synchronous signal output from the compact disc-digital processor and an enable signal output from the microcomputer;

a first flip-flop for holding an inverted output thereof in accordance with the first clock signal output from the operation initiating unit, thereby outputting a second clock signal;

a second flip-flop for detecting an error checking signal from the serial sub-que code data output from the compact disc-digital signal processor in accordance with the synchronous signal, thereby outputting the detected error checking signal to the microcomputer;

a counter for counting pulses of the second clock signal output from the first flip-flop and thereby outputting a ready signal to the microcomputer;

a data converting unit for shifting the serial sub-que code data output from the compact disc-digital signal processor by bits in accordance with the second clock signal output from the first flip-flop to convert the serial sub-que code data into parallel byte data, adjusting the position of each bit in the parallel byte data in accordance with a read signal from the microcomputer and then sending the resulting data to the microcomputer; and a timing control unit for generating a signal for clearing the counter using the enable signal and the read signal output from the microcomputer, and generating a signal for presetting the first flip-flop using the read signal output from the microcomputer and the ready signal output from the counter.

2. The sub-que code data read circuit in accordance with claim 1, wherein the operation initiating unit includes:

an inverter for inverting the synchronous signal output from the compact disc-digital signal processor;

a third flip-flop, being cleared by the enable signal output from the microcomputer, for latching an output of the inverter; and an AND gate for outputting the second clock signal in accordance with an output of the third flip-flop.

3. The sub-que code data read circuit in accordance with claim 1, wherein the data converting unit includes:

a serial/parallel shifter for shifting the serial sub-que code data output from the compact disc-digital signal processor by bits in accordance with the second clock signal output from the first flip-flop, thereby converting the serial sub-que code data into the parallel byte data; and a buffer for adjusting the position of each bit in the parallel byte data output from the serial/parallel shifter in accordance with the read signal output from the microcomputer.

4. The sub-que code data read circuit in accordance with claim 3, wherein the counter is a 4-bit counter and the buffer is a 8-bit buffer.

5. The sub-que code data read circuit in accordance with claim 1, wherein the counter outputs the ready signal at the eighth leading edge of the second clock signal output from the first flip-flop.

6. The sub-que code data read circuit in accordance with claim 1, wherein each of the first and second flip-flops is a D-flip-flop.

7. The sub-que code data read circuit in accordance with claim 1, wherein the timing control unit includes:

a first AND gate for logically ANDing the enable signal and the read signal both output from the microcomputer, thereby generating the signal for clearing the counter;

an inverter for inverting the ready signal output from the counter; and a second AND gate for logically ANDing outputs from the inverter and the first AND gate to generate the signal for presetting the first flip-flop.

8. A data reading circuit for a compact disc reading apparatus including a digital signal processor outputting serial sub-que code data and a microprocessor, the circuit comprising:

a data converting unit for converting the serial sub-que code data output from the digital signal processor into parallel byte data according to a second clock signal input thereto, the data converting unit being connected between the digital signal processor and the microcomputer;

a clock signal generating circuit for generating the second clock signal according to a synchronous signal output from the digital signal processor and an enable signal output from the microcomputer; and an error flag signal outputting circuit for outputting an error flag signal from the sub-que code data output from the digital signal processor to the microprocessor.

9. The circuit of claim 8, further comprising:

a counter for counting pulses of the second clock signal output from the clock signal generating circuit and thereby outputting a ready signal to the microcomputer.

10. The circuit of claim 9, further comprising:

a time control unit for generating a signal for clearing the counter using the enable signal and a read signal output from the microcomputer.

11. The circuit of claim 9, wherein the microprocessor outputs the read signal according to the error flag signal.

12. The circuit of claim 8, wherein the data converting unit includes:

a serial/parallel shifter for converting the serial sub-que code data output from the digital signal processor into the parallel byte data according to the second clock signal, and a buffer for rearranging a position of each bit of the parallel byte data according to a read signal output from the microprocessor.

13. The circuit of claim 8, wherein the clock signal generating circuit includes:

an inverter for inverting the synchronous signal output from the digital signal processor, a flip-flop being cleared by the enable signal from the microprocessor and thereby latching an output of the inverter, and a logic gate for outputting the second clock signal using an output of the flip-flop and a first clock signal externally input to the clock signal generating circuit.

14. A data reading method for a compact disc reading apparatus including a digital signal processor outputting serial sub-que code data and a microprocessor, the method comprising the steps of:

generating a second clock signal according to a synchronous signal output from the digital signal processor and an enable signal output from the microcomputer;

converting the serial sub-que code data output from the digital signal processor into parallel byte data according to the second clock signal; and outputting an error flag signal from the sub-que code data output from the digital signal processor to the microprocessor.

15. The method of claim 14, further comprising:

counting, using a counter, pulses of the generated second clock signal; and outputting a ready signal to the microcomputer according to the count value.

16. The method of claim 15, further comprising:

generating a signal for clearing the counter using the enable signal and a read signal output from the microcomputer.

17. The method of claim 16, further comprising:

outputting the read signal from the microprocessor according to the error flag signal.

18. The method of claim 14, wherein the converting step includes the steps of:

shifting the serial sub-que code data into the parallel byte data according to the second clock signal, and rearranging a position of each bit of the parallel byte data according to a read signal output from the microprocessor.

19. The method of claim 14, wherein the generating step includes the steps of:

inverting the synchronous signal output from the digital signal processor, clearing a flip-flop by the enable signal from the microprocessor and thereby latching the inverted synchronous signal, and performing a logic operation using an output of the flip-flop and a first clock signal externally provided, to generate the second clock signal.

* * * * *